CYLINDRICAL THIN FILM MAGNETIC CORE MEMORY

Filed June 1, 1964 3 Sheets-Sheet 1

INVENTOR

Richard L. Snyder

CYLINDRICAL THIN FILM MAGNETIC CORE MEMORY

Filed June 1, 1964 3 Sheets-Sheet 2

CYLINDRICAL THIN FILM MAGNETIC CORE MEMORY

Filed June 1, 1964 3 Sheets-Sheet 3

3,390,383
Patented June 25, 1968

3,390,383

CYLINDRICAL THIN FILM MAGNETIC CORE MEMORY

Richard L. Snyder, Fullerton, Calif.
(4625 Van Kleek Drive, New Smyrna Beach, Fla. 32069)

Filed June 1, 1964, Ser. No. 371,593
4 Claims. (Cl. 340—174)

ABSTRACT OF THE DISCLOSURE

A plated wire memory in which coherent rotational switching is employed for both read and write operations. Parallel circuits are used for carrying both recording signals and sensing to reduce the length of signal propagation paths and, thereby, increase operating speed. In this example, a single digit position is served by four parallel lines. A single recording circuit is coupled to the lines by a diode network. The lines are coupled to a sense amplifier by means of a transformer having multiple primary windings.

The invention is concerned with random access memories used in computers and other digital data handling systems, and more particularly with those in which bits of information are stored as states of polarity in oriented thin film magnetic cores subject to rotational switching.

The usefulness of a digital data store is generally dependent on its capacity and speed of access in storage and retrieval. These two factors determine the degree of complexity of information a system can handle and the rate at which it can be processed. Capacity in a given speed range is fairly direct function of cost. Speed is dependent on technique and has an inverse relationship to capacity. Usually high speed systems of large capacity require subdivision of systems into sub-systems which also cause large increases in cost. These characteristics of memories in many instances cause computers and other data handling systems to be primarily restricted in utility by economic limitations.

In an effort to lower the specific cost of data storage and to provide an inexpensive means of obtaining high speed operation, much work has been expended in the development of memories which store information in the form of states of polarity of fields in small cores formed of thin magnetic films. These cores, which are usually composed of Permalloy, can be manufactured by vapor or chemical deposition of the magnetic material on large planar substrates. A great many cores can be simultaneously deposited in a single series of operations. These cores which may be in the form of regions of a large continuous film or as individual isolated rectangular or circular areas are usually oriented by the presence of a magnetic field having the direction of the desired orientation during their formation and subsequent heat treatment. Such cores have properties which enable them to be selectively switched at extremely high speeds.

The characteristics, which are exploited in switching films, are derived from their orientation and small thickness. The orientation causes the magnetic fields in a film not subject to externally applied magnetomotive force to be parallel to the direction of orientation everywhere but very close to poles. Regions of uniform magnetization are called magnetic domains. Magnetic domains in flat films are bounded by domain walls which separate them from domains of opposite polarity. Domain walls are, therefore, composed of two like poles, one associated with each domain. Near the edges of flat films having reasonably low coercivities, i.e., less than ten oersteds, which form boundaries not parallel to the direction of orientation, there are always numerous small domains bounded by many jagged domain walls. These jagged walls develop to provide sufficient area to the pole regions to allow the flux to leave the magnetic poles at the low densities which can be supported by the coercivity of the material. The absence of such a mechanism would require the material to maintain a field at the edge of the film having flux density close to that in film which is in the order of ten thousand gauss. This would obviously be impossible with the coercivities employed. In uniformly magnetized regions, the molecular magnets are aligned parallel to the direction of orientation. Near domain walls, they are twisted away from the direction of orientation. If a region of uniform magnetization, that is, a central space in single domain, is subject to a magnetomotive force in a direction opposite the direction of magnetization having a magnitude less than what is called the anisotropy field $H_k$, there is no change in field. If a force near $H_k$ is applied in the presence of a second somewhat smaller magnetomotive force $H_t$ perpendicular to the direction of orientation in the plane of the film reversal of the field occurs with all of the molecular magnets rotating together. This rotational, or coherent, switching is exceedingly rapid having switching periods measured in nanoseconds. If a field is applied parallel to the direction of orientation to a region of the film having a domain wall, the wall will move in a direction to expand the domain having its field in the direction of the applied magnetomotive force. The wall motion force $H_o$ is usually considerably less than $H_k$ the anisotropy field. The maximum velocity of domain wall motion is about five thousand feet per second so switching a planar core of reasonable dimensions by wall motion is very much slower than by coherent switching.

Magnetic films, having a thickness greater than one or two thousand angstrom units, cannot be made in very small sizes and be switched successfully in the rotational mode. In thicker films, the length of domain walls required to permit the emergence of flux at a density that can be sustained by the coercivity of the material becomes too great to be accommodated by zig-zag patterns. Consequently, domains of opposite polarity form within the material having walls with relatively large surfaces curved in three dimensions. The area of these walls is relatively so large with respect to the volume of material that a much larger percentage of the molecular magnets are subject to the walls' influence and deflected from their normal position of orientation. This deflection has the same effect as the transverse field in making the elementary magnets more susceptible to switching fields and control of switching by means of transverse field is ineffective.

Selection of cores to be switched in memories using flat arrays of thin films is usually accomplished by passing current through one of a set of conductors laid over rows of cores perpendicular to the direction of their orientation and one of a second set of conductors close to the first set passing over columns of cores parallel to the direction of orientation. The current in one of the first type of conductor generates the reversing field $H_s$ and that in the second, the transverse field $H_t$. The core lying under the point of intersection is then subject to very fast switching. Unfortunately, the other cores lying under the conductor generating $H_s$ are subject to its influence. The domain walls near the edge of the film may experience enough magnetomotive force to be moved. For this reason, the current pulses are kept very short. However, experience has shown that the expedient of using short pulses does not prevent very small wall motion which eventually, after a large number of disturbances, causes such degeneration of the field pattern that the stored information is lost. Numerous methods of preventing information deterioration by moving the domain walls beyond the influence of the switching field, have been investigated. This kind of solution of the problem increases the complexity of the system, usually decreases its speed of operation and reduces the tolerances of magnetic characteristics and physical dimensions to or beyond the limits of the art.

The present invention describes a thin film memory system employing coherent switching in which the difficulties imposed by the presence of domain walls is eliminated by using cores having uniform closed magnetic paths in which domain walls do not exist. These cores are in the form of cylinders and have circumferential orientation. Due to the absence of domain walls in cores not undergoing switching, circumferentially oriented cylindrical cores can be somewhat thicker than cores having open magnetic circuits and still be switched coherently. They are produced by depositing magnetic materials on the surface of wires as described in my copending patent application entitled "Oriented Magnetic Memory Cores," Ser. No. 371,591. Other memories using cylindrical cores have been described, but these usually require complex circuits having more than one conductor threading each core and often small coils around each core. In memories of large capacity, conductor lengths are so great that signal propagation delays seriously limit the speed of operation. In the present invention, each core is threaded by a single relatively short conductor which also serves as the substrate on which it is deposited. Only one other conductor is required to serve each core position and that is outside the core and not subject to very critical dimensional tolerances.

It is, accordingly, an object of this present invention to provide an improved random access memory.

Another object of the invention is to provide a random access memory of simplified construction.

A further object of the invention is to provide a memory having the inherent high operating speeds achieved by rotational magnetic core switching.

Still another object of the invention is to exploit inherent speed of the coherent core switching by providing a conductor array having short paths for various signals.

And yet another object of the invention is to provide a memory configuration capable of being produced in large sizes and still maintain relatively short signal propagation paths.

One more object of the invention is to produce a memory system in which the specific cost is sufficiently low to permit the economic use of very large capacity units.

The foregoing and other objects and features of this invention will be more clearly understood from a consideration of the detailed description of one illustrative embodiment thereof which follows when taken in conjunction with the accompanying drawings in which.

Figures 4, 5:
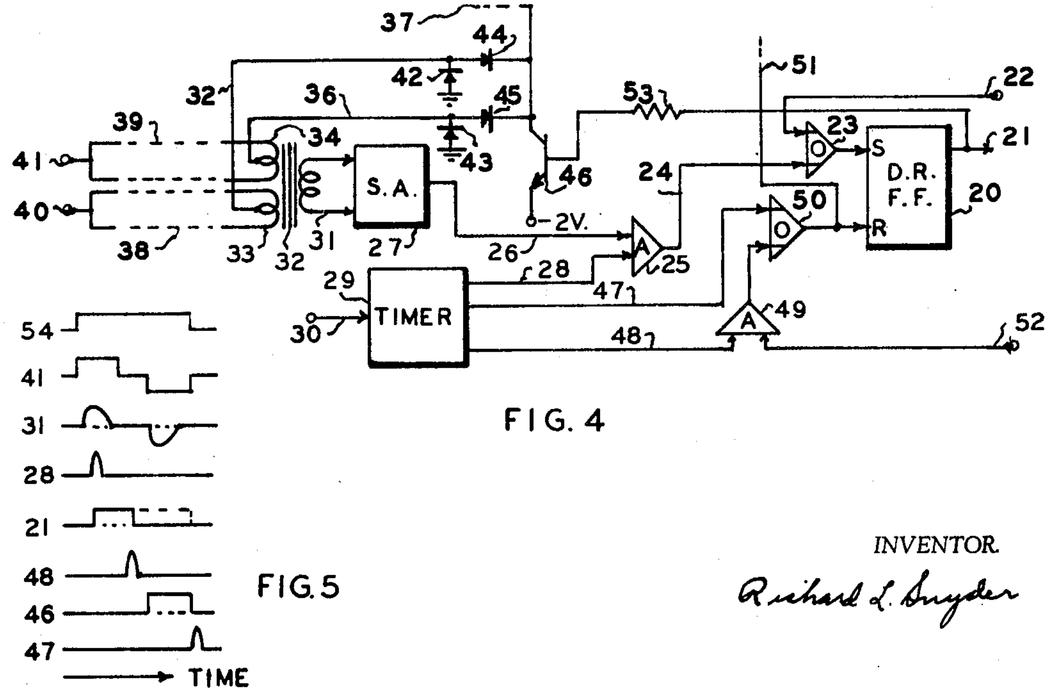
FIGURE 4 is a diagram of a circuit suitable for use as an input-output system for a memory constructed according to the invention.

FIGURE 5 displays the characteristics of various signals which appear in the circuit of FIGURE 4.

Figure 6:
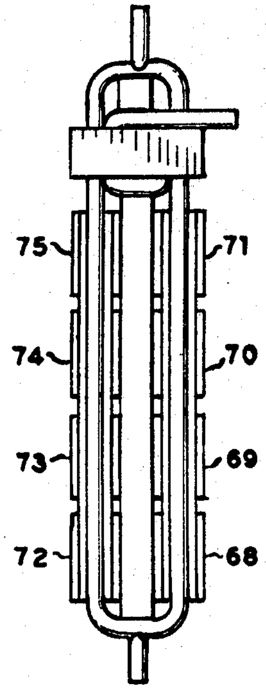

FIGURE 6 is a side elevation of a memory array made in accordance with the invention.

Figure 7:
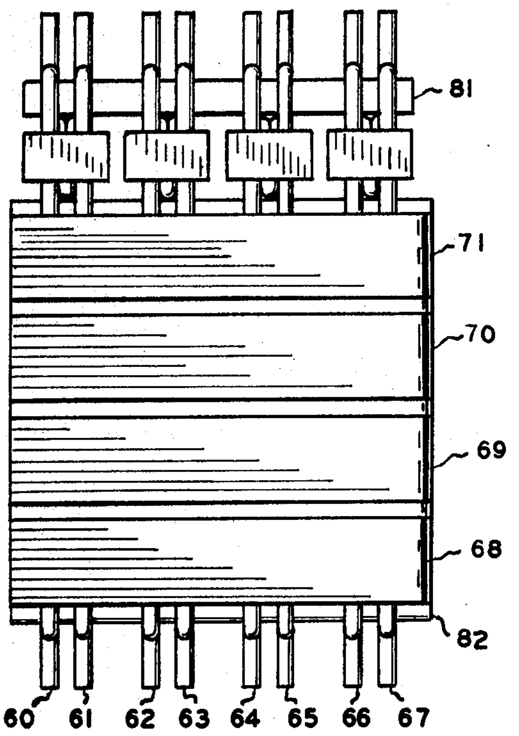

FIGURE 7 is a front elevation of FIGURE 6.

Figure 8:
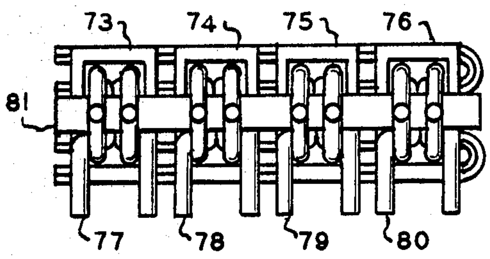

FIGURE 8 is a plan view of FIGURE 6.

Figure 9:
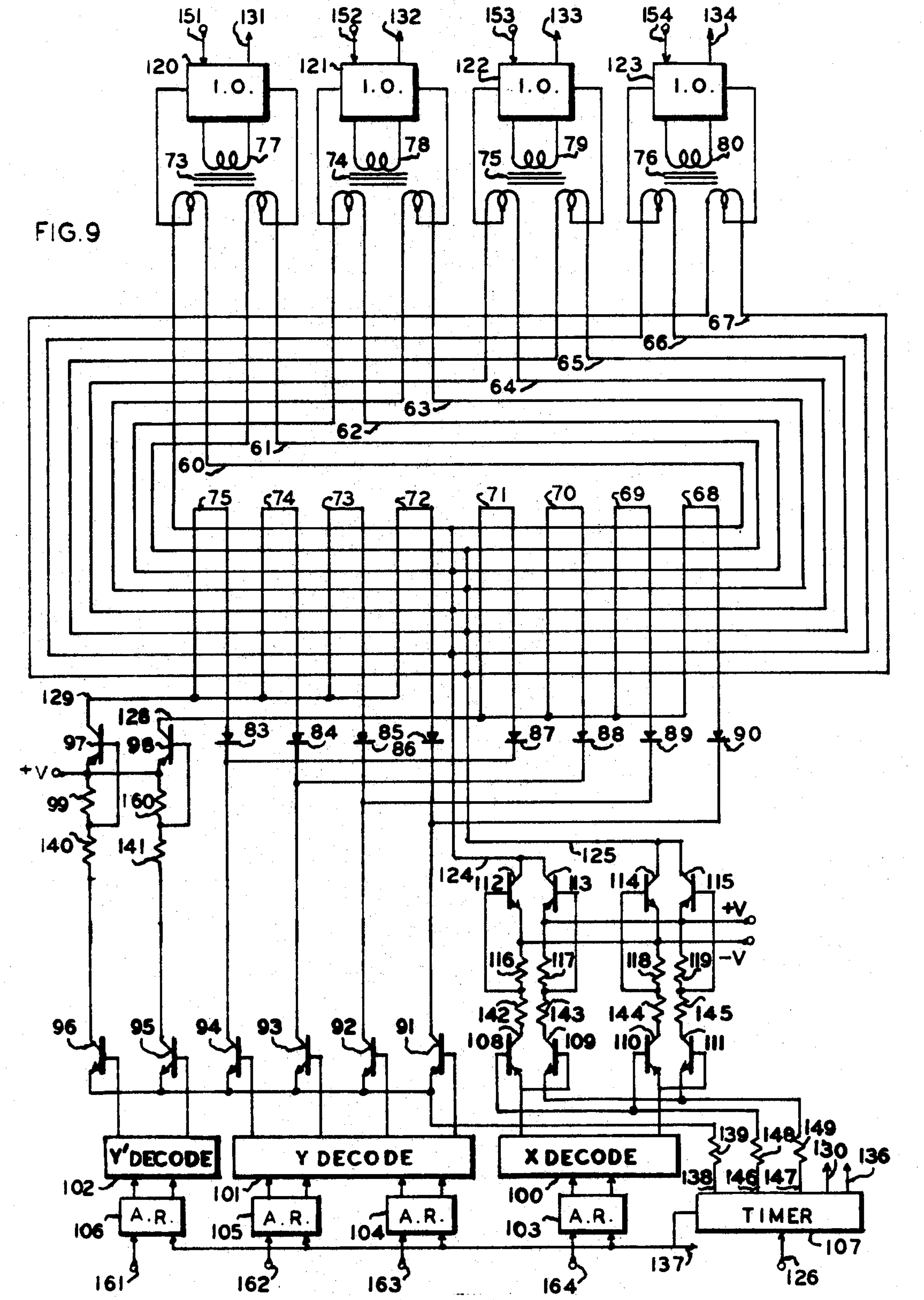

FIGURE 9 is a diagram of a circuit system to be used in conjunction with the memory arrays of FIGURES 6, 7, and 8 in accordance with the invention.

Figure 10:
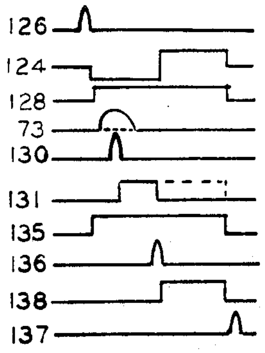

FIGURE 10 depicts various signals which are generated in the circuit of FIGURE 9.

Figure 1:
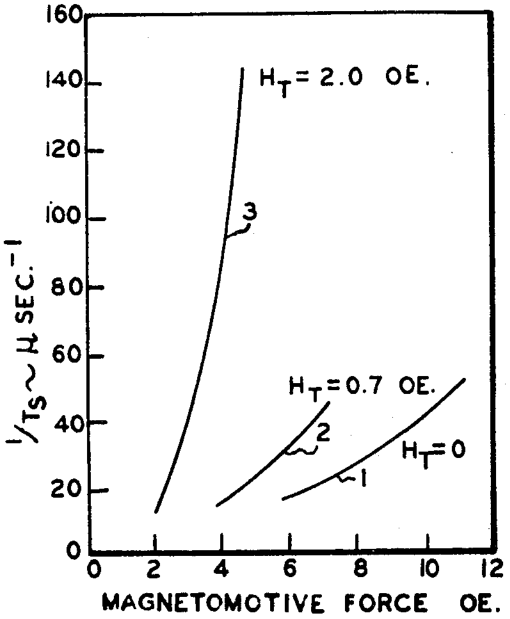
FIGURE 1 depicts the behavior of oriented thin magnetic films in the presence of various switching magnetomotive forces.

As mentioned above, very rapid reversal of field in an oriented magnetic thin film can be obtained by a combination of externally applied magnetomotive forces. FIGURE 1 shows the characteristic of a particular specimen. This is a flat film having an anisotropy field $H_k$ of about four and one-half oersteds and a coercivity $H_0$ of about one and one-half oersteds. In the diagram, the ordinate represents speed of switching as the reciprocal of time in microseconds. The abscissa indicates magnetomotive force of the reversing field in oersteds. This field is parallel to the direction of orientation and of opposite sign from the initial field in the film. Curve 1 shows how the speed of field reversal varies with changes in magnitude of the reversing field. Switching commences at a field of little above $H_k$ and requires about one-tenth microsecond. At a field of about two and one-half times $H_k$ switching occurs in one-fiftieth of a microsecond. Curve 2 is recorded with a transverse field of 0.7 oersted. Switching occurs at a switching field of about three and one-half oersteds in a tenth of a microsecond. A switching field equal to $H_k$ causes switching in a twenty-fifth microsecond and at seven oersteds, switching time is well under a fortieth microsecond. When the transverse field $H_t$ is raised to two oersteds, curve 3 is recorded. Switching occurs when $H_s$ is as little as two oersteds. When $H_s$ equals $H_k$, the switching time is considerably less than one hundredth of a microsecond. If both $H_s$ and $H_t$ are applied in simultaneous pulses of one hundredth microsecond duration, films of this type exposed to one or the other of these fields independently, will not be affected while complete switching will occur in films where both fields are present. The statement above applies only if there are no domain walls present in the films subject to $H_s$. If there are domain walls present, they will be moved by $H_s$. As mentioned earlier, all planer cores having low enough coercivity for use in memories have domain walls near their edges. Cylindrical cores having circumferential orientation can be kept free of domain walls.

Figure 2:
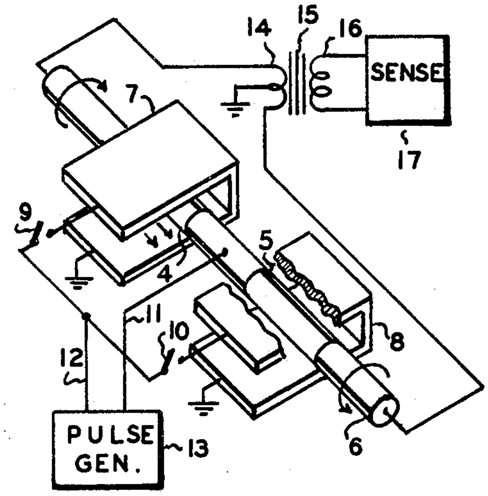
FIGURE 2 illustrates a means for selectively switching one of two cylindrical oriented thin magnetic cores in accordance with the invention.
Figure 3:
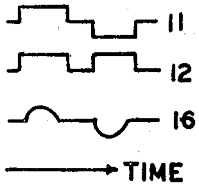
FIGURE 3 is a diagram of various signals in the system shown in FIGURE 2.

A system for demonstrating selective control of rotational switching is shown in FIGURE 2. Two cylindrical cores 4 and 5 are deposited on a round wire substrate 6. Above and below each core is a flat conductor which is part of a U shaped conductor that essentially encloses the core. These U shaped conductors 7 and 8 have one terminal connected to ground. The other terminals are connected through switches 9 and 10 to the line which is one output of a pulse generator 13. This pulse generator may be a piece of standard laboratory equipment or a unit especially constructed from standard components by one skilled in the electronic art. A second output terminal of the pulse generator is connected to the line 11 which terminates at the center of the wire substrate 6. The ends of the substrate are connected to the terminals of a transformer primary 14. A center tap on the primary is connected to ground. The transformer 15 has a secondary 16 which is connected to the input of a sense amplifier, oscillograph or other output device 17. In operation, one of the switches 9 or 10 is closed and the other open. The pulse generator produces pulses of alternate polarity on line 11 like those shown at 11 in FIGURE 3. The polarity of the signal to the U conductors is immaterial and is shown to be always positive at 12 in FIGURE 3. These signals occur simultaneously but do not necessarily have the same amplitude. The current pulses in line 11 produce the magnetic switching fields $H_s$ around the substrate 6 and in the cores 4 and 5 as indicated by the curved arrows around the ends of the substrate. These currents are of equal magnitude because the impedance on each side of the center connection to line 11 is equal and the transformer primary 14 is tapped at its precise center. Consequently, the currents flowing in each half of the transformer primary cancel one another and do not generate signals in the secondary 16. If the switch 9 is closed and switch 10 is open, the current pulses delivered to 7 through the line 12 generate a magnetizing force indicated by the straight arrows parallel to the axis of the cylindrical core. Since the cores are circumferentially oriented, their normal field condition is one is which the flux encircles the substrate. Therefore, the field generated by the substrate current is $H_s$ whereas that generated by the current in the U-shaped conductors is $H_t$. The core, in this instance, 4, which is subject to both fields switches back and forth during each cycle of pulses. The other core 5 does not switch because there is no transverse field and the switching field which is about equal to $H_k$ exists for such a short time that no lasting disturbance can occur. The switching of the core 4, which consists of the reversal of its field, induces a voltage in the substrate 6 which is not balanced by a similar voltage in the substrate on the other side of the center tap to line 11. This unbalanced voltage appears across the primary and induces a voltage in the secondary 16 like that shown at 16 in FIGURE 3. One outstanding advantage obtained by using cores having magnetic paths which enclose the sensing conductor is the perfect coupling achieved between the flux and the wire. Flat or open circuit cores have coupling coefficients with respect to pick up conductors passing on one side which are considerably less than half. In consequence, much larger currents are required to generate $H_s$ and much lower voltages are induced in the output lines in open core systems than in closed core structures. It should also be pointed out that the diameter of the substrate wire can be readily maintained within extremely narrow tolerances and the U shaped conductors almost completely enclose the cores. Therefore, variations in magnetomotive forces due to mechanical variations are very small, much smaller than can be obtained with planar core structures.

A balanced circuit system for conducting switching currents and reproducing output voltages like that shown in FIGURE 2 is used in the memory system to be described. FIGURE 4 shows the circuit used as the input-output system of a typical digit position. It has an element of the memory data register, a flip-flop 20. One input to the flip-flop is the line from the connected computer or other equipment 22 through which information bits to be stored are received. Signals on this line pass through the "or" gate 23 to the set terminal of the flip-flop. Another input to gate 23 is the line 24 from the "and" gate 25. One input to the "and" gate is the line 26 from the sense amplifier 27. The other input to the "and" gates 25 is the strobe line 28 from the timer 29. Both the sense amplifier 27 and the timer 29 are similar to units used in conventional memories and are not described in detail. The sense amplifier is a linear amplifier with a rectified output and has sufficient gain to amplify an input of a few millivolts to several volts. Pulses of either polarity are amplified equally and rectified so that either polarity of input pulse produces an output pulse of one polarity. The timer is a pulse generator which produces a sequence of signals on various output lines in response to an input of initiate pulse delivered to an input terminal 30 by the connected equipment. The timer output pulses include the read phase pulse, the write phase pulse, strobe pulse, end of read pulse, end of cycle pulse and bias pulse. The amplitude, time of occurrence, and duration of each signal are determined by the system requirements. Units of this type can be assembled from commercially available modules or from standard electronic components by those skilled in the electronic art. The line 47 from the timer 30 carries the end of cycle pulse through the "or" gate 50. The output of gate 50 is line 51 connected to the flip-flop reset and to the reset terminals of all other data register flip-flops in the memory. The other input to the "or" gate 50 is the output of the "and" gate 49. One input to gate 49 is the end of read pulse from the timer on line 48. The other input to gate 49 is a ready to write signal on line 52 which is received from the connected equipment. The output of the system is the output line 21 from the data register flip-flop 20. This line is also coupled to the base of the write control transistor 46 through the current limiting resistor 53. Line 21 has a zero-level of minus three volts and a one level of ground. The transistor is an NPN type and its emitter is maintained at minus two volts. The transistor collector is connected to the cathodes of diodes 44 and 45 and the cathodes of any similarly connected diodes in additional circuits serving the same digit position. The anodes of diodes 44 and 45 are connected to the cathodes of diodes 42 and 43 and to the center taps of transformer primaries 33 and 34. The anodes of diodes 42 and 43 are grounded. The transformer 32, in addition to the primaries 33 and 34, has a secondary 31 connected to the input of the sense amplifier 27. The terminals of the primaries 33 and 34 are connected to pairs of core wires 38 and 39. Each pair of core wires is terminated in the common connections 40 and 41. The core wires are the substrate wires and have equal numbers of cores deposited along their surfaces. The small signal impedances of the wires in each pair are equal so that the current between the terminals 40 and 41 and the center taps of transformer primaries 33 and 34 respectively will divide equally and induce no voltage in the transformer secondary. There may be many more pairs of core wires and center tapped primaries on one transformer equipped with diodes to ground and coupling diodes to the collector of the write control transistor 46.

In a cycle of operation in a memory built according to the invention, one of the terminals 40 or 41 is driven negative during the read phase which is the first phase of a memory cycle. The source of this potential is one of the line drivers to be described in connection with FIGURE 9. This voltage excursion causes current to flow in both pairs of the core lines to the primary center tap and to ground through either diode 42 or 43. This current generates $H_s$, the switching field, in all of the cores in the direction to cause them to switch to polarity to which the value zero is assigned. During this time a transverse field $H_t$ is generated parallel to the axis of one of the cores by current passed through a U-shaped conductor which encloses it and which will be described in connection with FIGURE 8. If the core subject to $H_t$ is initially in the zero polarity no switching occurs. If the core is in the one polarity, the fields cause it to switch and thereby induce a voltage in one of the core wires. The resulting unbalance in the connected primary generates a voltage in the transformer secondary 31 which is amplified by the sense amplifier 27 and delivered to the strobe gate 25 and through the "or" gate 23 to set the flip-flop 20 to one. The output of the flip-flop 21 delivers the signal, whether it is a zero resulting from no sense pulse during strobe or a one from the presence of an induced pulse, to the connected equipment. If no new information is to be introduced to the memory, the output 21 remains unchanged for the remainder of the cycle. If new information is to be stored in the memory, the ready to write line 52 is energized by the connected equipment in time to open gate 49 and allow the end of the read phase pulse on line 48 to pass through gates 49 and 50 to reset the flip-flop to zero. The end of read pulse is immediately followed by a signal on input line 22 which may be zero and leave the flip-flop 20 reset, or a one which passes through gate 23 to set the flip-flop to one. During the end of read pulse, the write phase is initiated with a positive voltage being impressed on the selected core wire terminal 40 or 41. If the bit in the flip-flop is zero, line 21 stays at minus three volts, transistor 46 does not conduct, its collector goes positive, no current flows in the core line and no core can switch. If the flip-flop bit is one, line 21 rises to ground potential and transistor 46 conducts. The conducting transistor 46 draws current through the diode coupling it to the energized circuit and the grounding diode of the circuit as well as the current resulting from the positive excursion of the core wire terminal. The transverse field about the selected core is maintained during this phase as well as during the read phase so that the selected core switches to one. At the end of the write phase, an end of cycle pulse is generated by the timer 29 on line 47 which passes through gate 50 to reset the flip-flop and conclude the operation.

The time relationship of the various signals generated during the operation is displayed in the drawing of FIGURE 5. At the top of the diagram is a pulse 54 representing the presence of the transverse field $H_t$. Next at 41 is the bi-polar signal applied to the terminal of the selected pair of wires. The signals, which are developed by a switching core in the transformer secondary, are shown at 31. The strobe signal is shown at 28. At 21 are the possible output signals. Next is shown the end of read pulse 48. This is followed by the current pulse in transistor 46 during writing. Finally, the end of the cycle pulse is shown at 47.

Three views of the core and conductor array designed according to the invention are shown in FIGURES 6, 7, and 8. The unit, chosen for simplicity of illustration, has a capacity of sixteen four bit words. Two groups of four cores store eight bits in each pair of core wires. The center terminals of these core wire loops are at the bottom of FIGURES 6 and 7 and are used to identify the loops by the numbers 60, 61, 62, 63, 64, 65, 66, and 67. The upper end of the loops in these figures pass through the windows of the shell type transformers 273, 274, 275 and 276 to form single turn primary coils. Center taps of the primaries are formed by the connections at the top of FIGURES 6 and 7 on the terminal block 81. Secondaries of the transformers 77, 78, 79, and 80 are wound over the central bars of the transformer cores before the core wires are put in place. In FIGURE 6 are shown the terminal ends of eight U-shaped conductors, 68, 69, 70, 71, 72, 73, 74 and 75, each of which encloses one core on each core wire loop. The circumferentially oriented cores may be composed of continuous films of magnetic material on the core wire or may be formed by a series of isolated rings of deposited magnetic material. Current passed through the core wire produces the circumferential switching magnetomotive force. Current through one of the U-shaped conductors generates the transverse control field parallel to the axis of the cores.

A memory system in which the above described core array may be used is shown in FIGURE 9. Various signals generated in the system are depicted in FIGURE 10. Reference in the description is also made of the circuit of FIGURE 4. Four of these circuits are indicated in FIGURE 9 by the transformers 73, 74, 75, and 76, and their secondaries 77, 78, 79 and 80 and the blocks to which the secondaries are connected 120, 121, 122 and 123. These blocks have data input terminals 151, 152, 153 and 154 and data output terminals 131, 132, 133 and 134. Also the core lines 60, 61, 62, 63, 64, 65, 66, and 67 are similar to core lines 40 and 41 in FIGURE 4. The U shaped conductors are represented by 68, 69, 70, 71, 72, 73, 74 and 75. One terminal of each of these conductors is connected to three others to provide two groups of four having common terminals. One group is connected by the line 128 to the collector of a PNP transistor 98. The other group is connected by line 129 to the PNP transistor 97. Emitters of both these transistors are connected to a source of positive voltage. Their bases are also connected through resistors 99 and 160, to the source of positive voltage. These bases are also connected to the collectors of the NPN transistors 95 and 96 through the current limiting resistors 140 and 141. The other terminals of the U shaped conductors are connected to the anodes of the diodes 83, 84, 85 86, 87, 88, 89 and 90. The cathodes of these diodes are connected to four lines so that corresponding U shaped conductors in each group are coupled by diodes to common lines. These four lines are connected to the collectors of the NPN transistors 91, 92, 93 and 94. The bases of these transistors are connected to the output terminals of the Y decoder 101. One, and only one, of these terminals rises to ground potential from minus three volts during a memory cycle. The terminal, which is positive, is determined by the value of two digits stored in the address register flip-flop elements 104 and 105. The bases of the NPN transistors 95 and 96 are connected to the output terminals of the Y′ decoder 102, one of which is at ground potential while the other is at minus three volts during the memory cycle. The Y′ decoder is controlled by the digit stored in the address register flip-flop element 106. It should be mentioned that the voltage excursions mentioned are only by way of example as are also the number of address register elements and decoder output terminals. The emitters of transistors 91, 92, 93, 94, 95, and 96 are connected together and coupled through the current limiting resistor 139 to terminal 138 of the timer. This terminal is driven from one volt positive to two volts negative during the memory cycle. During a memory cycle, one of the group connecting lines 128 or 129 is driven positive by the transistor 97 or 98 which is caused to conduct by current energizing its base. The base current results from conduction of either transistor 95 or 96 controlled by the Y′ decoder output and emitter current from line 138. The emitter of one of the transistors connected to the Y decoder terminal which is at ground, will deliver current to its collector which passes through the diode connected to it and to the positive group, thus energizing one U shaped conductor selected by the Y address register number.

The center terminal of one pair of core lines in each digit position is connected to a common conductor which is subject to a line driver. Core line terminals 60, 62, 64 and 66 are connected to line 124. Core line terminals 61, 63, 65 and 67 are connected to line 125. Line 124 is also connected to the collectors of PNP transistor 112 and NPN transistor 113. Line 125 is connected to the collectors of PNP transistor 114 and NPN transistor 115. The emitters of the PNP transistor are connected to a source of positive voltage and those of the NPN transistors to a source of negative voltage. The bases of these transistors are coupled to their emitters by the resistors 116, 117, 118 and 119. Bases of the NPN transistors 112 and 114 are coupled to the collectors of PNP transistors 108 and 110 through the current limiting resistors 142 and 144. Bases of PNP transistors 113 and 115 are coupled to the collectors of NPN transistors 109 and 111 through the current limiting resistors 143 and 145. The emitter of PNP transistor 108 and the base of NPN transistor 109 are connected together and to one output of the X decoder 100. Similarly, the base of 111 and the emitter of 110 are connected to the second output of X decoder 100. One of the decoder outputs is at ground potential and the other is at approximately minus three volts during a memory cycle. The terminal which is positive is determined by the number in the address register flip-flop 103. More than the two line driver circuits shown can be controlled by an X decoder with an output for each driver and inputs from as many address register flip-flops as may be required by the larger decoder. The emitters of the PNP transistors 108 and 110 are connected to the timer output through the current limiting resistor 148. The bases of the NPN transistors 109 and 111 are coupled to the timer output line 147 through the current limiting resistor 149. Prior to the beginning of the read phase, the address of the word to be selected is introduced into the address register on lines 161, 162, 163 and 164 from the connected equipment. During the read phase of a memory cycle, timer output 147 is at minus two volts. At other times, it is at plus two volts. During the write phase, line 146 is at minus two volts and at other times at plus one volt. During the read phase, the line driver, selected by the most positive output of the X decoder, is energized during the read phase with transistor 109 or 111 conducting and causing 113 and 115 to conduct and cause line 124 or 125 to be driven to a potential very close to that of the negative supply. During the write phase, the remaining transistors of the selected driver conduct and drive the same line to within about a volt of positive supply voltage.

The currents in the selected U conductor and the selected core wire pairs enable the events described in connection with FIGURES 4 and 5 to occur. FIGURE 10 depicts various signal pulses which occur during a read write cycle. Preceding a memory cycle, the flip-flop elements of the address register are set up by the signals from the connected equipment to the number of the address of the required word. An initiate pulse from the connected equipment triggers the timer as shown in the uppermost signal at 126. The selected line driver then starts to produce its sequence of bi-polar pulses 124. At the same time, the selected U shaped conductor starts to draw current as shown at 128. If a one is read, a signal like that at 73 is generated in the secondary of the output transformer. If a zero is read, no signal is developed in the transformer output, a condition indicated by the dotted line under the pulse. Near the peaking time of the one signal, the strobe pulse 130 is delivered by the timer. If zero is being retrieved, no pulse is transmitted to set the data register flip-flop and it remains reset. If a one is retrieved, a pulse is passed through the strobe gate and sets the data register flip-flop as shown at 131. If no new information is to be stored during the cycle, the retrieved bit is retained in the flip-flop for the remainder of the cycle over a period indicated by the dotted outline. If new information is to be stored during the cycle, a ready to write signal 136 is received from the connected equipment. This signal opens a gate which permits an end of read pulse 136 from the timer to set the flip-flop. The new information is immediately introduced to the flip-flop. If the new information is zero, the flip-flop remains reset. If it is one, the flip-flop is reset energizing the write amplifier to cause the current pulse 138 to pass through the selected pair of core wires switching the selected core to one. At the end of the write phase, the end of cycle pulse, generated by the timer, resets the data register and address register flip-flops to zero.

A memory has been described in which there are a number of novel features which cause it to be an improvement over more conventional memories. The cores are easily manufactured in quantity by continuous methods with relatively simple equipment. Cores so produced require only one wire through each core. This wire is the support on which the core is produced. Hence, the core and wire can be installed in an array by means of winding techniques. Little precision is required in placing the core wire in the array because the cooperating conductors are at right angles to the core wire and extend over all that are used. Energizing the core wire is accomplished by line drivers similar to those used in conventional memories. The cooperating conductors require only unidirectional currents which can be controlled by much less complicated selecting circuits than the line drivers normally required for such lines. The cores are of thin magnetic material and having closed magnetic circuits are not prone to difficulties resulting from magnetic domain wall formation experienced with cores having open magnetic circuits. Furthermore, the closed magnetic paths provide perfect coupling to the sense line and much higher output signals requiring much less magnetizing current for switching and producing these signals than cores having open magnetic circuits. Short small diameter cores permit very high core packing densities. Densities of the order of ten thousand bits per square inch in layers less than a thirty-second inch are practical. The thin film core is capable of being switched at extremely high speeds. The switching and sensing conductors, even in large capacity systems, can be kept so short that loss of speed due to signal propagation time is almost negligible.

Having thus described my invention, I claim:

1. A bit storage element of a magnetic core memory comprised of a circumferentially oriented cylindrical magnetic film having a closed magnetic path deposited on a cylindrical conductor, and a second conductor coupled to the core so that its conducting path is substantially perpendicular to the axis of the core, said cylindrical conductor forming two legs of an electrical bridge including transformer means, bipolar pulse means connected to said two legs for energizing said bridge, and unipolar pulse means coupled to said second conductor for simultaneously energizing said bridge.

2. A bit storage element of a magnetic core memory in which cores are switched by coherent rotational switching comprised of a circumferentially oriented cylindrical thin film core of magnetic material having a closed magnetic path deposited on a cylindrical conductor, a second conductor which is formed so that two parts thereof are positioned close to the ends of a diameter of the core with parallel conducting paths substantially perpendicular to the axis of the core in which a current in said second conductor has opposite directions on either side of the core and can produce a magnetic field substantially parallel to the axis of the core and perpendicular to the orientation thereof, means for switching said core in a coherent mode which include unipolar pulse means for energizing said perpendicular conductor with said current sufficient to produce a magnetomotive force transverse to the undisturbed magnetic field in the core having an intensity which is between 25% and 95% of the field required to produce an irreversible change in the flux in the core, bipolar pulse means for simultaneously energizing separate portions of the cylindrical conductor upon which the core is deposited with current which produces a circumferential magnetomotive force polarized in the direction of switching required and having an intensity which is between 25% and 95% of the anisotropy field of the core and means forming a balanced bridge with said cylindrical conductor for detecting the voltage induced in said cylindrical conductor by a change in the flux in the core.

3. A random access memory comprised of an array of magnetic cores and conductors and cooperating electronic circuits, cores of said array consisting of circumferentially oriented thin magnetic films deposited on cylindrical conductors which combine the functions of X select conductors, write control conductors and sense conductors, said array having Y select conductors formed in narrow loops positioned close to two sides of the cores, being insulated therefrom and providing conducting paths substantially perpendicular to the X conductors, said X conductors provided with connections at each end and at their midpoints, each of said Y conductors passing on both sides of one core on each X conductor, said electronic circuits including means for selectively energizing one of the Y conductors with current which generates a magnetomotive force parallel to the axis of all of the cores about which the energized Y conductor is positioned during one memory operation, a transformer having center tapped primary windings and a secondary winding, said X conductors arranged in groups of equal numbers wherein the ends of all of the X conductors of a group are connected to terminals of the center tapped primary windings of said transformer, said electronic circuits including means for selectively supplying a sequence of two voltage pulses of alternating polarity to the midpoint connections of one X conductor in each group during a memory operating cycle, said electronic circuits including means for preventing substantial voltage change of the center tap of the transformer primaries during the first voltage pulse of a memory operation that is applied to the midpoints of selected X conductors and causing current to flow through those conductors selected and producing a circumferential magnetomotive force in the core on the selected X conductors, said electronic circuits including means of selectively preventing substantial voltage change of the center taps of the primaries of a transformer during the application of the second pulse to the midpoint connections of the selected X conductors in a memory operation, thereby causing current to flow in prescribed X conductors of those selected and generating magnetomotive forces in the cores thereon having a polarity opposite that present during the first pulse period of the memory operation, said electronic circuits also include means for detecting voltage induced in the second windings of said transformers by the switching of cores on the selected X conductors during the first pulse applied to the midpoint connections of the selected X conductors.

4. A magnetic core memory comprised of an array of cores, and a network of conductors coupling said cores to an address system and an at least one input amplifier and at least one output amplifier said output amplifier equipped with an input transformer having at least one tapped primary winding and a secondary winding coupled to the amplifier input; the cores in said array which are coupled to one input amplifier and one output amplifier to be composed of pairs of groups, a conductor for each of said groups coupling the cores therein to said input and output amplifiers, said group coupling conductors connected in pairs having one end of each conductor of a pair connected to a common terminal and the other ends connected to the terminals of one of said transformer primary windings, said conductor pairs and transformer primary proportioned to form an electrical bridge; the input to said bridge being between the terminal common to each of said pair of conductors and to the tap of the transformer primary to which said pair is connected; said input coupled to said address system and said input amplifier; the output of said bridge being the secondary of said transformer; said bridge is adjusted to be balanced and produce substantially zero voltage in its output for all input signals except those which cause a core coupled to one of the conductors of said pair to switch, said bridge output coupled to said output amplifier in such a way that voltages generated in the transformer secondary by the unbalanced condition of said bridge are amplified to produce an output.

References Cited

UNITED STATES PATENTS

| | | | |
|---|---|---|---|
| 2,083,353 | 3/1963 | Bobeck | 340—174 |
| 3,105,962 | 10/1963 | Bobeck | 340—174 |

STANLEY M. URYNOWICZ, Jr., *Primary Examiner.*